(12) United States Patent
Mukherjee et al.

(10) Patent No.: US 7,483,535 B2
(45) Date of Patent: Jan. 27, 2009

(54) TRANSMISSION OF GENERALIZED SCALABLE BIT-STREAMS

(75) Inventors: Debargha Mukherjee, San Jose, CA (US); Huisheng Wang, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 875 days.

(21) Appl. No.: 10/940,961

(22) Filed: Sep. 15, 2004

(65) Prior Publication Data
US 2006/0062389 A1 Mar. 23, 2006

(51) Int. Cl.
*H04K 1/00* (2006.01)
*H04L 9/00* (2006.01)
(52) U.S. Cl. ........................ 380/256; 380/42
(58) Field of Classification Search .......... 380/256, 380/42
See application file for complete search history.

(56) References Cited

U.S. PATENT DOCUMENTS

2004/0196975 A1* 10/2004 Zhu et al. .............. 380/258
2005/0276416 A1* 12/2005 Zhu et al. .............. 380/210

OTHER PUBLICATIONS

Mukherjee, D. et al., "Fully Scalable Video Transmission Using the SSM Adaptation Framework", Jul. 2003.
Mukherjee, D. et al., "MPEG-21 DIA: Objectives and Concepts", 2004.

* cited by examiner

*Primary Examiner*—Kambiz Zand
*Assistant Examiner*—Aubrey H Wyszynski

(57) ABSTRACT

A method of encrypting a transmission unit of a generalized scalable bit-stream includes, for each atom of the transmission unit, concatenating bit-stream segments that map to the atom to obtain data for each atom. The data for a logically first atom of the plurality of atoms of the multi-dimensional scalable representation is encrypted using an initialization input to produce an encryption output seed of the logically first atom and an encrypted logically first atom. In addition, the data of other atoms are encrypted to produce encrypted other atoms and an encryption output seed of each encrypted other atom. Encryption of a particular atom of the other atoms includes using encryption output seeds of adjacent causal atoms of the particular atom as an encryption input seed for encrypting the particular atom.

40 Claims, 10 Drawing Sheets

TRANSMISSION OF GENERALIZED SCALABLE BIT-STREAMS

BACKGROUND OF THE INVENTION

Multimedia content may be accessed through any number of diverse networks and terminals. Networks over which multimedia content may be delivered include telephone lines, wireless networks, and high-speed optical fibers. For example, a user may request, and receive, multimedia content from a server on the Internet.

Users may use a variety of terminals to access such multimedia content, ranging from handheld devices to high definition workstations. Users generally access networks using various devices capable of delivering content in a variety of formats. Faced with variations in the types of content that may be transmitted or received by a user, a rigid media representation format, producing decompressed content only at a fixed resolution and quality, presents various limitations. For instance, certain users may be unable to receive certain content, or may receive poor quality and resolution data due to the limitations of their network connections and accessing devices. In addition, the inability to provide content in formats compatible with new devices has somewhat inhibited the growth of new rich media and the devices on which they are used, because such rich content can be used only by high-end devices.

One technique for providing media content to users having a variety of capabilities and preferences is to provide multiple versions of the media that are suited to a variety of capabilities and preferences. While this approach works with delivery models where the recipient directly connects to the media originator, significant redundancy and inefficiency may be introduced for any other scenario, leading to wasted bandwidth and storage. Redundancies and inefficiencies are particularly problematic when catering to a large consumer base, thereby mandating maintenance of numerous versions of similar content.

Another technique is the use of generalized scalable bit-streams. A generalized scalable bit-stream often scales simultaneously along multiple logical dimensions. For such bit-streams, adaptation primarily consists of deleting bit-stream segments followed by other minor editing operations conducted on fixed length fields. Generalized scalable bit-streams can typically accommodate a variety of users by automatically addressing a given user's computing power and connection speed. One example of a generalized scalable bit-stream is JPEG2000, which is a scalable standard for still images that seeks to combine various types of scalability including image quality scalability and image resolution scalability in a format specific to the universal JPEG2000 compressed data. The use of JPEG2000 generally enables distribution and viewing of images of various qualities and resolutions using various connections and devices.

Various types of bit-stream scalability can be devised depending on the type of media content addressed. For example, signal-to-noise ratio ("SNR" or quality) scalability refers to progressively increasing quality as more and more of the bit-stream is included, and applies to most types of media. Resolution scalability refers to fineness of spatial data sampling, and applies to visual media such as images, video, and 3D images. Temporal scalability refers to fineness of sampling in the time-domain, and applies to video and other image sequences. Certain scalability pertains solely to audio, such as number of channels and sampling frequency. Different types of scalability can co-exist, so as to provide a range of adaptation choices.

Security is generally a concern in transmitting data over networks. For generalized scalable bit-streams, security issues present problems because the generalized scalable bit-streams are typically adapted to cater to the format or other constraints of receiving terminals before being transmitted to the receiving terminals. Thus, conventional methods, such as stream ciphers or cipher block chaining, applied to the bit-stream as a whole will not work for generalized scalable bit-streams because these bit-streams are typically adapted in the encrypted domain. If bit-stream segments are deleted during the adaptation, a receiving terminal may not be able to decrypt the bit-stream.

Another approach to encryption of generalized scalable bit-streams is to encrypt each atom or logical unit, defined as the smallest logical denomination in multi-dimensional scalability, independently. However, this would require the initialization vector of the encryption to be transmitted for each atom rather than each transmission unit. Encrypting each atom would be less efficient than encrypting a transmission unit, and would not be desirable from a security perspective since decryption for each atom can be conducted independently. Thus, encrypting each atom independently would provide more clues to a potential attacker to crack the block cipher, and would enable the potential attacker to work on atoms independently.

It would thus be desirable to provide a more secure method for transmitting generalized scalable bit-streams.

SUMMARY OF THE INVENTION

A method of encrypting a transmission unit of a generalized scalable bit-stream includes, for each atom of the transmission unit, concatenating bit-stream segments that map to the atom to obtain data for each atom. The data for a logically first atom of the plurality of atoms of the multi-dimensional scalable representation is encrypted using an initialization input to produce an encryption output seed of the logically first atom and an encrypted logically first atom. In addition, the data of other atoms are encrypted to produce encrypted other atoms and an encryption output seed of each encrypted other atom. Encryption of a particular atom of the other atoms includes using encryption output seeds of adjacent causal atoms of the particular atom as an encryption input seed for encrypting the particular atom.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

A secure method for transmitting generalized scalable bit-streams is described. Generalized scalable bit-streams are usually logically multi-dimensional. The generalized bit-streams may be encrypted prior to transmission by following encoding dependencies in the bit-stream. Data atoms of a transmission unit may be encrypted by deriving the starting state of the encryption engine for a particular atom encrypted subsequent to the first atom of the transmission unit from the ending states of the encryption engine for all causal adjacent atoms of the particular atom that differ in exactly one co-ordinate from the particular atom. Thus, truncation of a transmission unit in a scalable dimension beyond a particular atom will not affect its ability to be decrypted by a receiving terminal. Further, any adaptation engine in a network may adapt the transmission unit without decrypting the transmission unit.

Bit-stream description metadata transmitted with each transmission unit describes the high-level structure of the bit-stream. The metadata may provide information regarding the bit-stream, such as the dimensions of the multi-dimensional logical model, and the mapping of each atom to the actual bit-stream segments belonging to the atom. A network adaptation engine may use the metadata to adapt content of the bit-stream. The bit-stream description metadata may be part of an unencrypted header of the bit-stream for each transmission unit.

Figure 1:
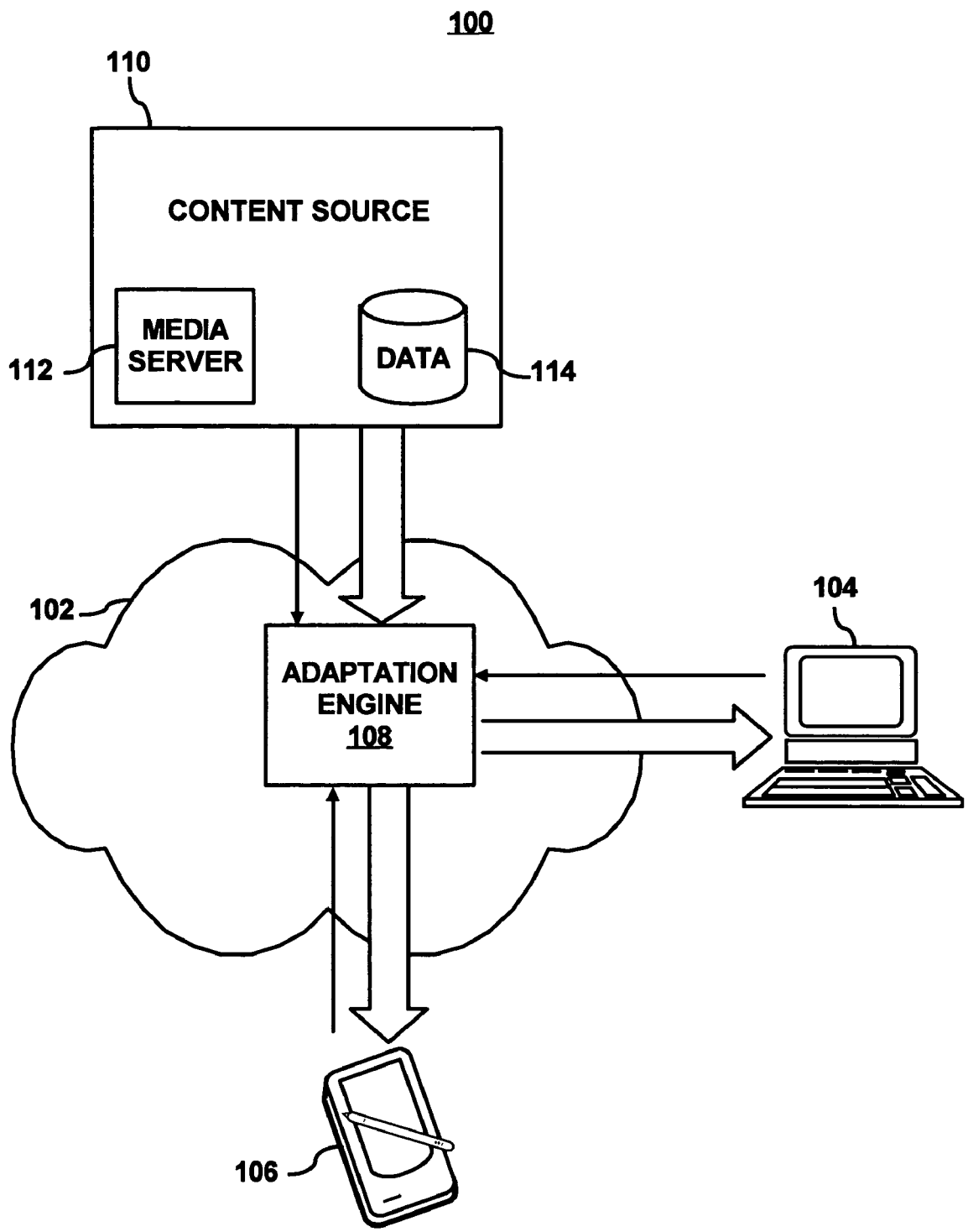
FIG. 1 illustrates a simplified example of a network through which multimedia content may be transmitted, according to an embodiment of the invention.

FIG. 1 illustrates a simplified example of a network 100 through which multimedia content may be transmitted. The network 100 may be configured to access the Internet 102 and may include a content source 110 having a media server 112 and a data store 114 to store multimedia content. Although shown as one entity, the media server 112 may be part of a separate entity connected to the content source 110 through, for example, a wired connection, a wireless connection, or a combination thereof. In addition, there may be a greater or lesser number of content sources and servers than those illustrated in FIG. 1.

In general, the content source 110 and the media server 112 are devices that provide the capability to process and store data, and to send and receive such data. In this respect, the content source 110 and/or the media server 112 may be a computer system as well as other types of devices that may not be typically considered computer systems but have similar capabilities.

In communication with the network 100 are client devices, such as a stationary client device 104 and a mobile client device 106. The client devices 104, 106 may be coupled to the network 100 via a wired connection, a wireless connection, or a combination thereof. It should be understood that there may be a greater or lesser number of client devices 104, 106 without deviating from a scope of the network 100 illustrated in FIG. 1.

An adaptation engine 108 adapts content at a point between transmission of content from the content source 110 and receipt of the content at a client device 104, 106. The adaptation engine 108 may include any reasonably suitable adaptation engine, including, for instance, an untrusted adaptation engine. As will be discussed in greater detail below, because adaptation may be implemented as a simple dropping of atoms, an adaptation engine does not need to decrypt content in order to perform adaptation on the content. In addition, the adaptation engine 108 may be provided in a proxy or edge server (not shown). In general, the network 100 enables data to be provided from a content source 110, and/or from an adaptation engine 108, to one or more of the client devices 104, 106.

The data from the content source 110 may be in the form of a scalable bit stream. A scalable bit stream is a bit stream where a smaller subset the whole bit stream produces representations at a lower quality, resolution, etc. Different types of scalability (for instance, quality, resolution, temporal, interactivity, etc.) apply to different types of media, and often more than one kind is combined in a particular media type. Furthermore, in rich media content several independent elements may be combined (for instance, video, animation, 3-D audio, etc.).

A logical model may be created in a generalized scalable bit-stream. In a logical model, a bit-stream may be divided into several logical segments called transmission units. Each transmission unit may be modeled as a multi-dimensional hypercube, with a certain number of layers in each dimension. For example, for fully scalable video, each transmission unit is a Group of Frames (typically 16 or 32), each of which may be encoded in a 3-dimensional temporal-spatial-quality scalable manner.

Figure 2:
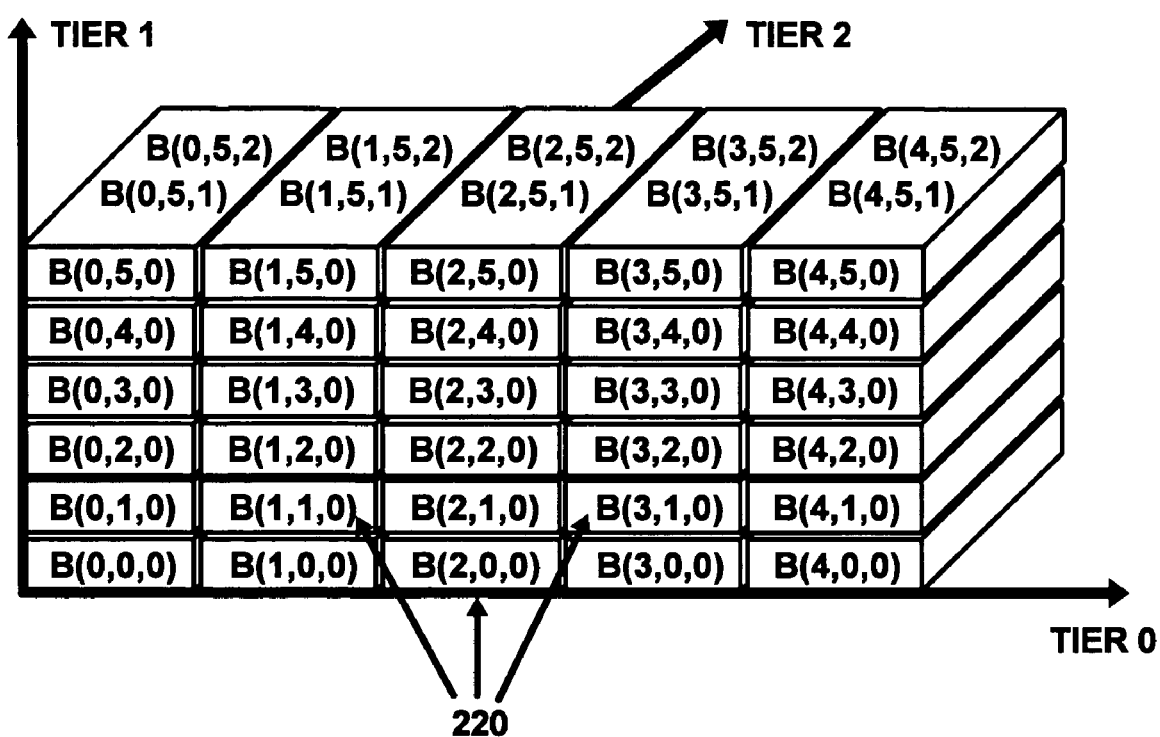
FIG. 2 is an illustration of a hypercube representation of a generalized scalable bit-stream, according to an embodiment of the invention.

FIG. 2 is an illustration of a hypercube 210 representation of a generalized scalable bit-stream. Although the hypercube 210 shown in FIG. 2 is depicted as being three-dimensional, the hypercube 210 may have any reasonably suitable number of dimensions. For example, the hypercube 210 may be two, four, five, or more dimensional, etc.

Without loss of generality, if a scalable bit stream contains L nested tiers of scalability, with the ith tier containing $l_i$ layers, where i=0, 1,..., L−1, then the bit stream may be represented by $l_0 \times l_1 \times ... \times l_{L-1}$ logical data segments $B(j_0, j_1,..., j_{L-1})$, where $j_i$=0, 1,...$l_i$−1. Each cell of the hypercube 210 represents an atom 220. As shown in FIG. 2, an atom 220 is indicated by a vector of integer coordinates, $B(j_0, j_1,..., j_{L-1})$, for $j_i$=0, 1,..., $l_i$−1. Each atom 220 maps to a certain segment in the bit-stream, and may map to multiple bit-stream segments.

For the generalized scalable bit-stream, adaptation consists of deleting bit-stream segments followed by minor editing operations conducted on fixed length fields. The logical hypercube 210 may be adapted by truncation along multiple dimensions. For example, a JPEG2000 bit-stream embeds multiple resolution levels, and multiple quality levels simultaneously. From this bit-stream, a first set of bit-stream segments could be deleted to obtain a low resolution, but a high quality adapted version, or alternatively, a second set of bit-stream segments could be deleted to obtain a high resolution, low quality adapted version.

Figure 3:
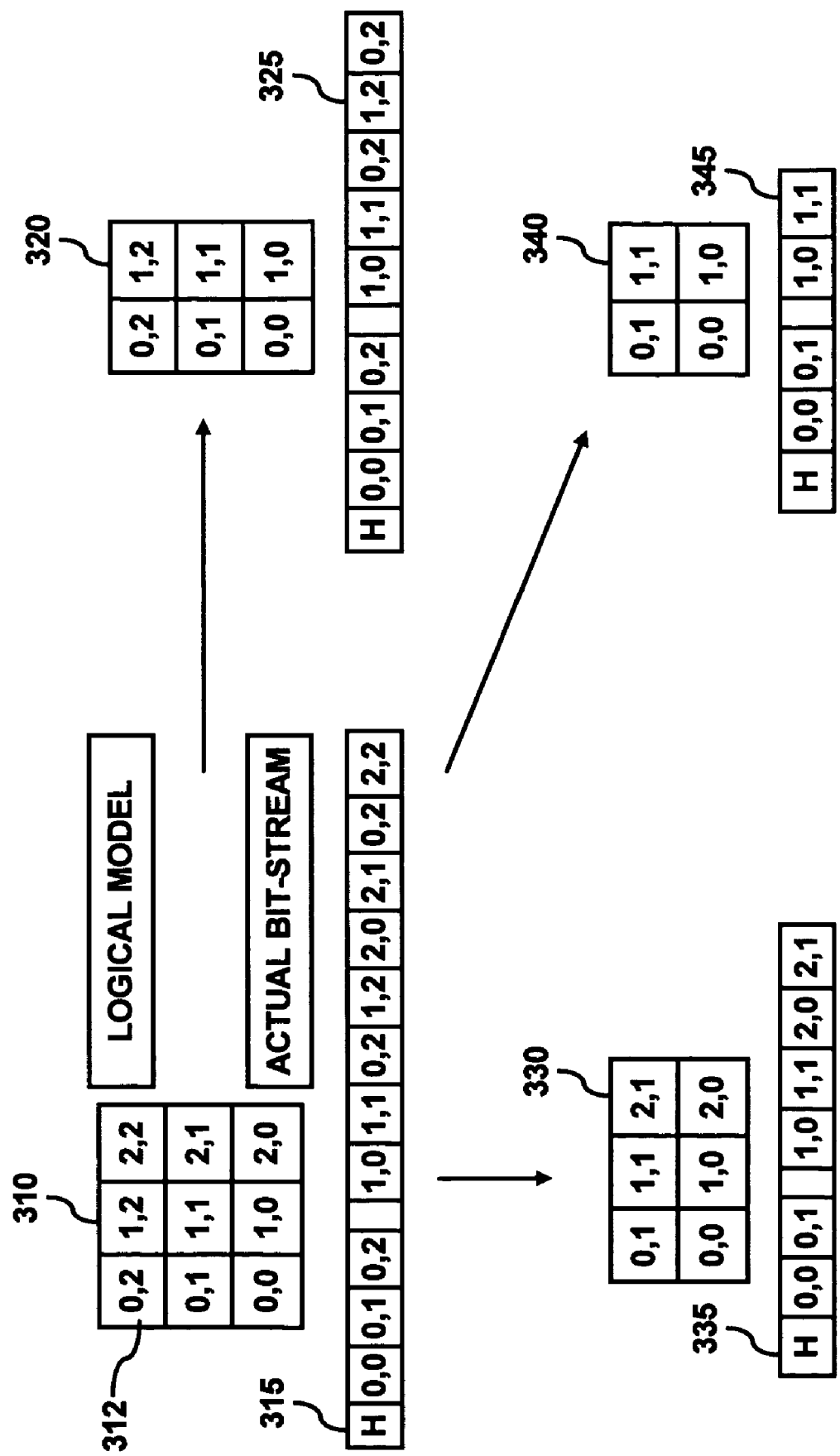
FIG. 3 illustrates an example of adaptation for a two-dimensional, 3×3 hypercube, and its corresponding actual bit-stream, according to an embodiment of the invention.

FIG. 3 illustrates an example of an adaptation for a two dimensional, 3×3 hypercube 310, and its corresponding actual bit-stream 315. In the example shown, the actual bit-stream 315 is obtained by scanning the hypercube 310 column-wise from left to right, and each column from bottom to top. In other examples, actual bit-streams may be obtained, for instance, by scanning the atoms 312 of the hypercube 310 row-wise from bottom to top, and each row from left to right.

As shown in FIG. 3, the actual bit-stream 315 includes a header H, followed by atoms 312 from the hypercube 310. The logical first atom 312 of the actual bit-stream is (0,0), followed by the atoms (0,1), (0,2), (1,0), (1,1), (0,2), (1,2), (2,0), (2,1), (0,2), and (2,2). As seen in the actual bit-stream 315, some atoms 312, such as (0, 2), map to multiple segments in the actual bit-stream 315. This occurs because the hypercube 310 represents a logical model of the actual bit-stream 315 and some atoms 312 of the logical model may occur more than once in the actual bit-stream 315. Metadata transmitted with the actual bit-stream 315 may include information mapping the logical model to the actual bit-stream 315, thus identifying where logical units, such as atom 312, are to be inserted in the actual bit-stream 315. For example, metadata would describe that atom (0, 2) of the hypercube shown in FIG. 3 is to be inserted three times in the actual bit-stream.

As an example, the tier extending horizontally may represent the resolution of an image while the tier extending vertically may represent the quality of an image. Thus, removal of a column from the hypercube 310 would represent adapting the bit-stream to a lower resolution version of the media content. Removal of a row from the hypercube 310 would represent adapting the bit-stream to a lower quality version of the media content.

FIG. 3 further illustrates logical models 320, 330, 340 and respective actual bit-streams 325, 335, 345 for three adaptations derived from the hypercube 310. A first adaptation removes the third column from the 3×3 hypercube 310 to produce a first 3×2 logical model 320. Thus, atoms (2, 0), (2, 1) and (2, 2) are removed from the hypercube 310 to produce the first adaptation logical model 320. The actual bit-stream 325 for the first adaptation has (0, 0) as the first atom 312, followed by the atoms (0, 1), (0, 2), (1, 0), (1, 1), (0, 2), (1, 2) and (0, 2). As described hereinabove, some atoms 312 of the logical model may occur more than once in the actual bit-stream 325. Continuing with the example above, the first adaptation would represent a lower resolution, high quality version of the hypercube 310.

The second logical model 330 represents the second adaptation. In this adaptation, a row is removed from the hypercube 310. Thus, continuing with the image example above, the second adaptation would represent a high resolution, lower quality version of the hypercube 310. In this case, the actual bit-stream 335 of the second adaptation has (0, 0) as the first atom 312, followed by (0, 1), (1, 0), (1, 1), (2, 0) and (2, 1). Thus, if the actual bit-stream were encrypted with encryption of each atom 312 dependent on the preceding atom 312, a receiving client 104, 106 may be unable to decrypt the actual bit-stream 335 for the second adaptation. More particularly, the receiving client 104, 106 may be unable to decrypt the actual bit-stream 335 because, as shown in FIG. 3, the atom 312 that originally preceded atom (1, 0), which is atom (0,2), and the atom 312 that originally preceded atom (2, 0), which is atom (1, 2), are no longer in the second adaptation bit-stream 335. Thus, a client 104, 106 receiving the second adaptation bit-stream 335 would not have the necessary information to decrypt the second adaptation bit-stream 335.

In one respect, the data in the atoms 312 of a multi-dimensional model, such as the hypercube 310, may be encrypted following the encoding dependencies in the bit-stream. Thus, for multi-dimensional data, only information from atoms 312 that precede atoms $(i_1, i_2 ...i_n)$ in the multidimensional logical model or the hypercube 310 may be used to encrypt atoms $(i_1, i_2 ... i_n)$. Therefore, only atoms $(p_1, p_2 ...p_n)$ unequal to $(i_1, i_2 ...i_n)$, such that $p_1 \leq i_1$, $p_2 \leq i_2$, may be used to encrypt atoms $(i_1, i_2 ...i_n)$.

In one example, the starting state of the encryption engine for an atom $(i_1, i_2 ...i_n)$ may be derived from the ending states of the encryption engine of all of its causal adjacent atoms differing in exactly one co-ordinate. For a bit-stream having n-dimensional capability, the number of adjacent causal atoms that differ in exactly one co-ordinate is a maximum of n. Thus, for example, in the 2-dimensional hypercube 310, the starting state of the encryption engine for atom (2, 2) will be made to depend on the ending state of the encryption engine for atoms (1, 2) and (2, 1).

The third adaptation logical model 340 represents removal of a row and a column of atoms 312 from the hypercube 310. Thus, in the image example above, the third adaptation logical model 340 would represent a lower resolution, lower quality version of the image represented by the hypercube 310. Similarly to the second adaptation bit-stream 335, the third adaptation bit-stream 345 is missing the atom 312, which is atom (0, 2), that originally preceded atom (1, 0). However, if the causal adjacent atom encryption method described above is used, the encryption of atom (1, 0) will depend on the ending state of the encryption engine for only atom (0, 0). Thus, a client 104, 106 receiving the third adaptation bit-stream 345 will have the necessary information to decrypt the third adaptation bit-stream 345.

Figure 4:
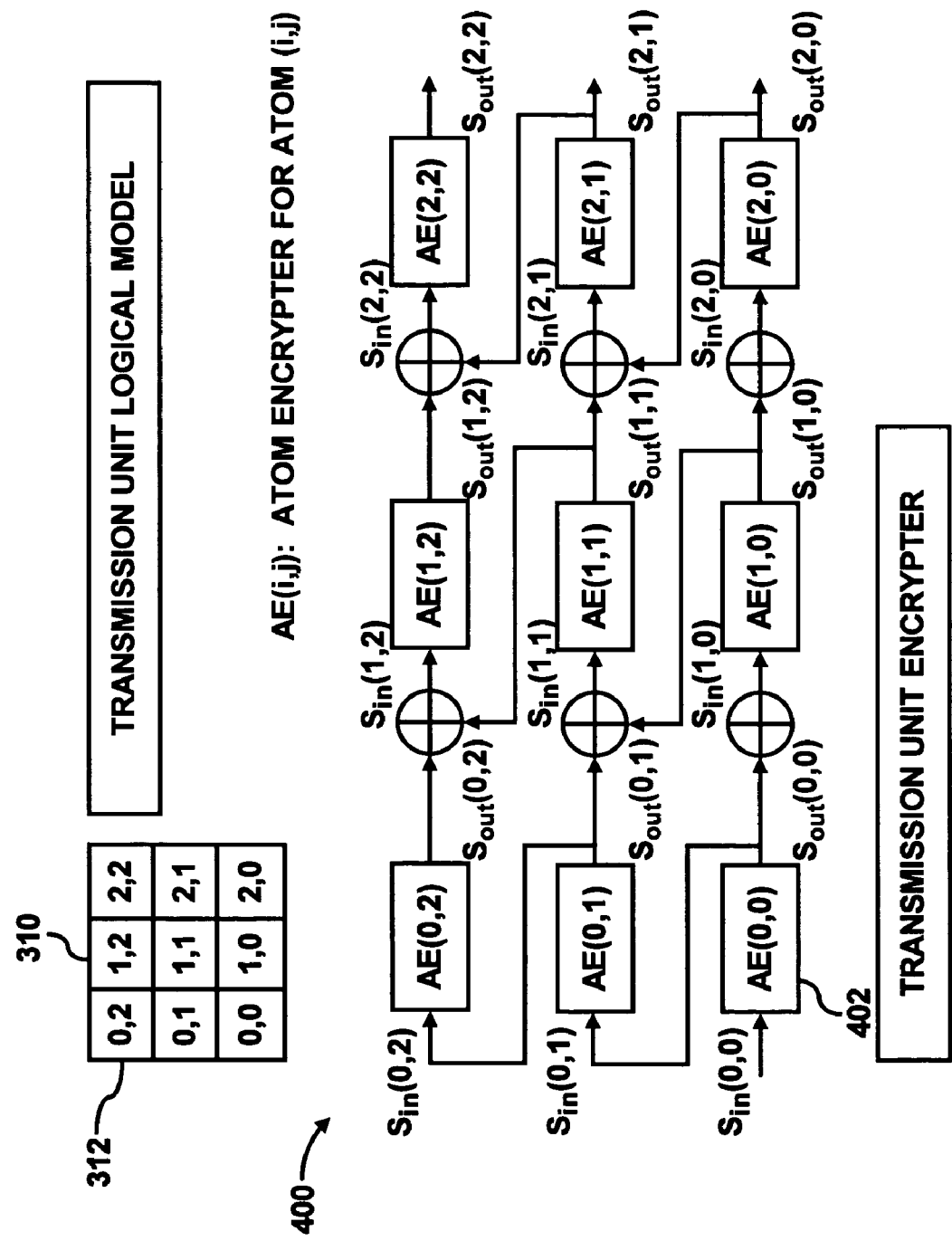
FIG. 4 illustrates an example of a transmission unit encrypter, according to an embodiment of the invention.

FIG. 4 illustrates an example of a transmission unit encrypter 400 using an encryption method where the starting state of the encryption engine for an atom may be derived from the ending states of the encryption engine of all of its causal adjacent atoms differing in exactly one co-ordinate. The transmission unit encrypter 400 includes a plurality of atom encrypters (AE) 402, which may be designed to encrypt each atom 312 of the hypercube 310.

The starting state, or Seed in ($S_{in}$), of the atom encrypter (AE) for an atom $(i_1, i_2 ...i_n)$ is denoted by $S_{in}(i_1, i_2 ...i_n)$, and the ending state, or Seed out ($S_{out}$), after encryption of the atom $(i_1, i_2 ...i_n)$ is denoted by $S_{out}(i_1, i_2 ...i_n)$. In one example, $S_{in}(0, 0...0_n)$ may be chosen to be a random initialization vector. Then $S_{in}$ for each successive atom $S_{in}(i_1, i_2 ...i_n)$ may be chosen so that:

$$S_{in}(i_1, i_2 ...i_n) = S_{in}(i_{1-1}, i_2 ...i_n) \; XOR \; S_{in}(i_1, i_2...i_n)$$
$$XOR...XOR \; S_{in}(i_1, i_2 ...i_{n-1}).$$

The data to be encrypted for each atom is obtained by concatenating the bit-stream segments that map to the atom in the order in which they appear in the bit-stream. The diagram shown in FIG. 4 is generic, and applies to any atom encrypter. The $S_{in}$ and the $S_{out}$ may represent any state on which the encryption engine depends. For example, the atom encrypter 402 may be a stream cipher, encrypting units of plaintext smaller than the blocks of data encrypted by a block cipher. For a stream cipher, a keystream is generated to encrypt the plaintext. Thus, in the case of a stream cipher, $S_{in}$ and $S_{out}$ represent the internal state of a keystream generator. In another example, the atom encrypter 402 may include a block cipher operating in a variety of modes, as shown in FIGS. 5A-5D.

Figure 5A:
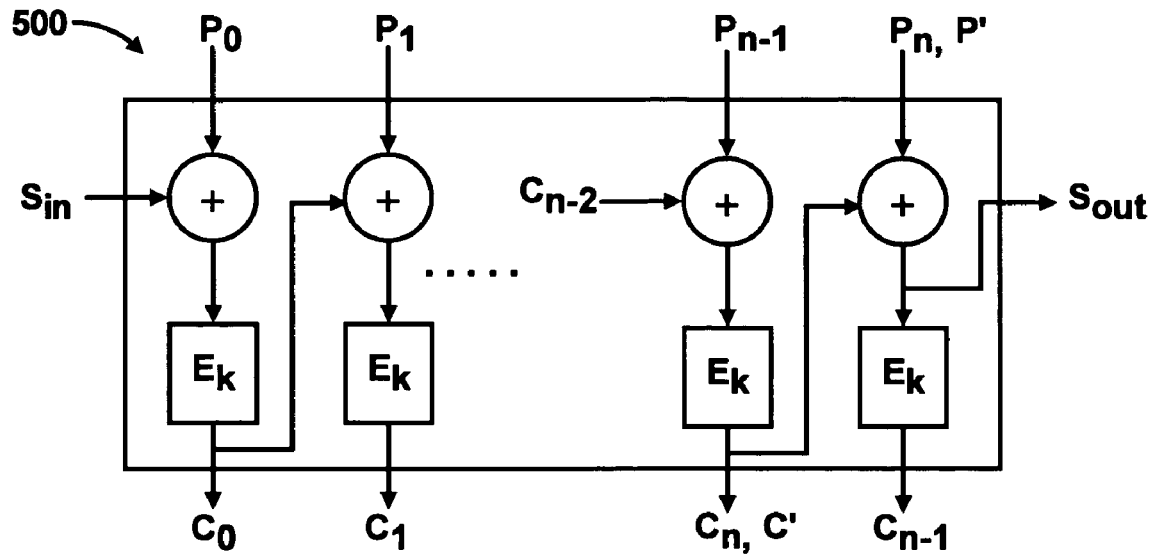
FIG. 5A illustrates a block cipher operating in a cipher block chaining mode, according to an embodiment of the invention.

FIG. 5A illustrates a block cipher 500 operating in a cipher block chaining (CBC) mode using ciphertext stealing to ensure that the length of the cipher is exactly the same as the length of the input atom. The input atom is represented by $(P_0P_1 \ldots P_{n-1}P_n)$ where $P_0P_1 \ldots P_{n-1}$ are full blocks of data (64 bits or 128 bits), and $P_n$ is a final short block. $P_n$ is padded with a known pattern P'. $S_{in}$ represents the seed for the encryption of the input atom. $S_{out}$ represents the seed out to derive seeds for encryption of successive atoms.

An XOR function is performed on input data block $P_0$ and $S_{in}$ for the atom encrypter. An XOR function is performed on each subsequent block of data $P_1 \ldots P_n$ of the input atom and the previous ciphertext block before encryption is performed at encryption module $E_k$. The encrypted atom is represented by $(C_0C_1 \ldots C_{n-1}C_n)$ where $C_0C_1 \ldots C_{n-1}$ are full encrypted blocks (64 bits or 128 bits), and $C_n$ is a final short encrypted block. If the length of an atom to encrypt is not a multiple of 64 or 128, a short block, P', is added at the end to achieve a length-preserving encryption. For example, the atoms are denoted as $P_0, P_1, \ldots, P_n$, where $P_n$ is the short atom. To make $P_n$ up to a full 128 bits, a pattern P' is added. Thus, $(P_n, P')$ is now 128 bits. The pattern P' is known to both the encrypter and the decrypter, because the pattern P' only depends on the length information.

In CBC mode, the ciphertext for $P_0, P_1, \ldots, P_n$ is denoted as $C_0, C_1, \ldots, C_{n-1}, C_n$, where $C_n$ is the short block. However, $C_n$ and $C_{n-1}$ are reversed so that $C_{n-1}$ is the output of the last $E_k$ block. The output of the previous block is $(C_n, C')$, where C' is not actually transmitted. The decrypter reverses the last $E_k$ block to obtain the message corresponding to $C_{n-1}$. For example, the last block may be denoted as $(D_n, D')$, where $D_n$ is the same length as $P_n$ or $C_n$. Then $(C_n, C')$ XOR $(P_n, P') = (D_n, D')$. This equation implies that:

$(C_n, C')$ XOR $(D_n, D') = (P_n, P')$. For the first part, $P_n = C_n$ XOR $D_n$, yielding $P_n$. For the latter part, $P' = C'$ XOR $D' => C' = P'$ XOR $D'$.

Once C' is obtained, the next to last block can be decrypted from $(C_n, C')$. Thus, the encrypted atom is of the same length as the original atom input into the atom encrypter, and a decrypter will be able to decrypt the encrypted atom even without being provided with C'.

Figure 5B:
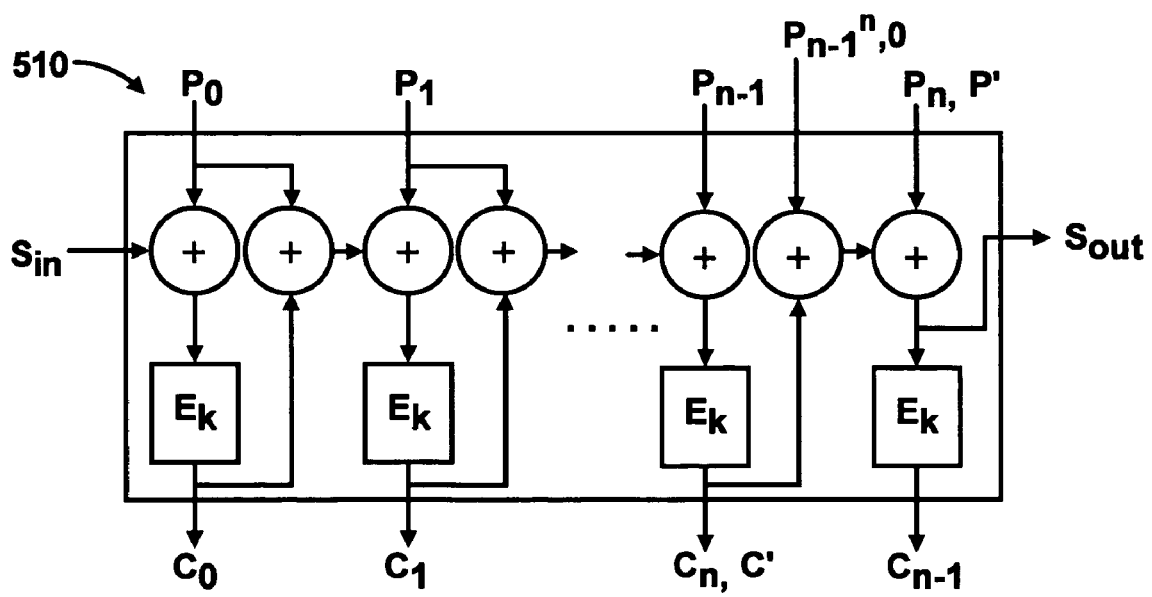
FIG. 5B illustrates a block cipher operating in a propagating cipher block chaining mode, according to an embodiment of the invention.

FIG. 5B illustrates a block cipher 510 operating in a propagating cipher block chaining (PCBC) mode 510 which is a variation of the CBC mode 500. As described with respect to the block cipher 500 and 510, the input atom is represented by $(P_0P_1 \ldots P_{n-1}P_n)$, where $P_0P_1 \ldots P_{n-1}$ are full blocks of data (64 bits or 128 bits), and $P_n$ is a final short block. $P_n$ is padded with a known pattern P'. $S_{in}$ represents the seed for the encryption of the input atom. $S_{out}$ represents the seed out to derive seeds for encryption of successive atoms. As with the CBC mode 500, an XOR function is performed on input data block $P_0$ and $S_{in}$ for the atom encrypter. An XOR function is performed on each subsequent block of data $P_1 \ldots P_n$ of the input atom, the corresponding previous input block of data $P_0P_1 \ldots P_{n-2}$, and the previous ciphertext block before encryption at the encryption module $E_k$.

Before the final encryption module $E_k$, an XOR function is performed on $P_{n-1}''$, 0, the input block $P_n$, P' and the previous ciphertext block, where $P_{n-1}''$ represents the part of the block $P_{n-1}$ which is the same length as $P_n$. The encrypted atom is represented by $(C_0C_1 \ldots C_{n-1}C_n)$ where $C_0C_1 \ldots C_{n-1}$ are full encrypted blocks (64 bits or 128 bits), and $C_n$ is a final short encrypted block.

PCBC 510 may also be considered as encrypting a block $(Q_0Q_1Q_2 \ldots Q_{n-1}Q_n)$ with regular CBC 500, where $Q_0=P_0$, $Q_1=P_1+P_0,\ldots,Q_{n-1}=P_{n-1}+P_{n-2}$, $Q_n=P_n+P_{n-1}''$, where $P_{n-1}''$ is the part of the block $P_{n-1}$ with the same length as $P_n$. The decrypter may first decrypt $(Q_0Q_1Q_2 \ldots Q_{n-1}Q_n)$ using regular CBC and then obtain $(P_0P_1P_2 \ldots P_{n-1}P_n)$ using: $P_0=Q_0$, $P_1=Q_1+P_0,\ldots,P_{n-1}=Q_{n-1}+P_{n-2}$, $P_n=Q_n+P_{n-1}''$. Thus, in this case, not only encryption but also decryption needs to be progressive, because the $S_{out}$ is not available from the ciphertext directly, making the code more difficult to break.

Figure 5C:
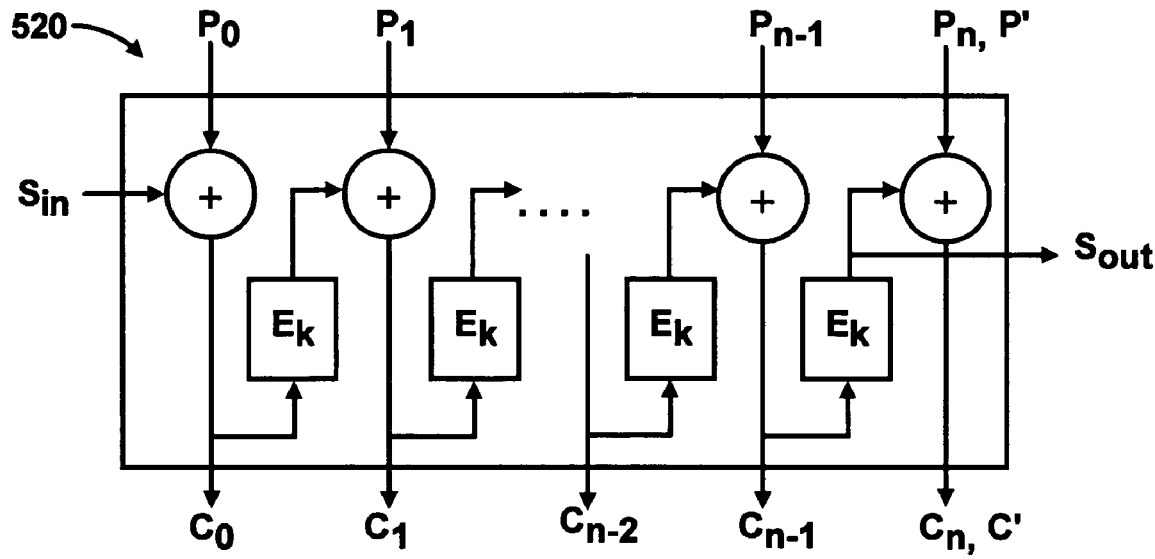
FIG. 5C illustrates a block cipher operating in a cipher feedback mode, according to an embodiment of the invention.

FIG. 5C illustrates a block cipher 520 operating in a cipher feedback (CFB) mode using ciphertext stealing to ensure that the length of the cipher is exactly the same as the length of the input atom. As described with respect to the block cipher 500 and 510, the input atom is represented by $(P_0P_1 \ldots P_{n-1}P_n)$, where $P_0P_1 \ldots P_{n-1}$ are full blocks of data (64 bits or 128 bits), and $P_n$ is a final short block. $P_n$ is padded with a known pattern P'. $S_{in}$ represents the seed for the encryption of the input atom. $S_{out}$ represents the seed out to derive seeds for encryption of successive atoms.

An XOR function is performed on input data block $P_0$ and $S_{in}$ for the atom encrypter to obtain the first encrypted block $C_0$ before actual encryption in encryption module $E_k$. An XOR function is performed on each subsequent block of data $P_1 \ldots P_n$ of the input atom and the previous ciphertext block to obtain each subsequent encrypted block $C_1 \ldots C_n$. In the CFB mode, $S_{out}$ is the output of the last encryption block $E_k$, prior to the last XOR function performed on $P_n$, P' and the previous ciphertext block. The encrypted atom is represented by $(C_0C_1 \ldots C_{n-1}C_n)$ where $C_0C_1 \ldots C_{n-1}$ are full encrypted blocks (64 bits or 128 bits), and $C_n$ is a final short encrypted block. Thus, the encrypted atom is of the same length as the original atom input into the atom encrypter. A decrypter will thus be able to decrypt the encrypted atom even without prior knowledge of C'. For the last block $(P_n, P')$ XOR (Output from $E_k$)=$(C_n, C')$. This implies that $(P_n, P')$=(Output from $E_k$) XOR $(C_n, C')$, which in turn implies that $(P_n, C')$=(Output from $E_k$) XOR $(C_n, P')$. Since P' is known to both the encrypter and decrypter from the length information, the decrypter may readily find $(P_n, C')$ and may simply discard the C' part since the C' part is not required to decrypt the atom.

Figure 5D:
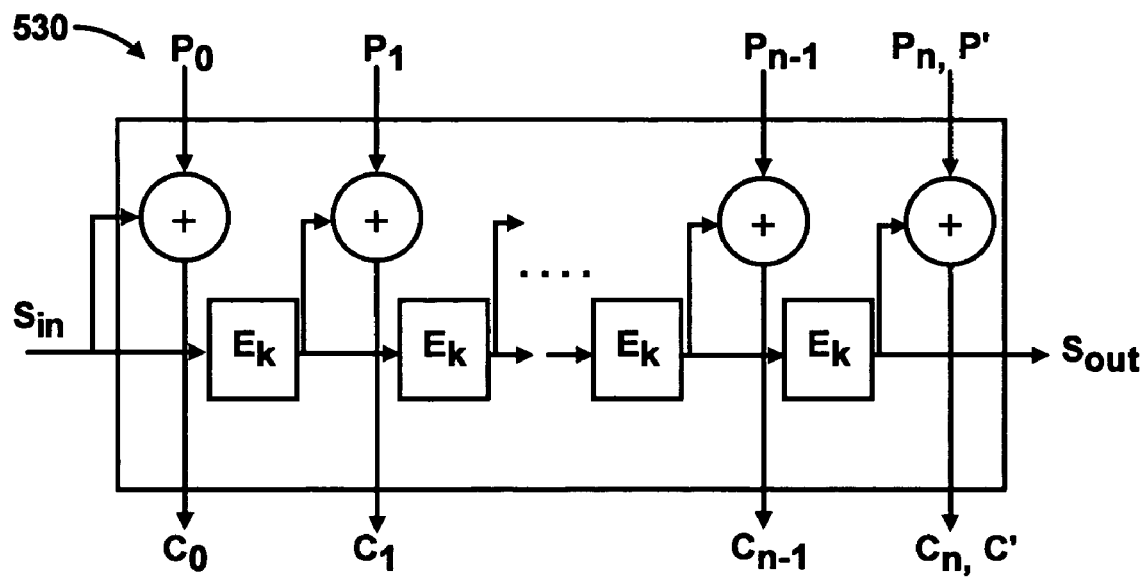
FIG. 5D illustrates a block cipher operating in an output feedback mode, according to an embodiment of the invention.

FIG. 5D illustrates a block cipher 530 operating in an output feedback (OFB) mode using ciphertext stealing to ensure that the length of the cipher is exactly the same as the length of the input atom. As described hereinabove with respect to the block ciphers 500, 510 and 520, the input atom is represented by $(P_0P_1 \ldots P_{n-1}P_n)$ where, $P_0P_1 \ldots P_{n-1}$ are full blocks of data (64 bits or 128 bits), and $P_n$ is a final short block. $P_n$ is padded with a known pattern P'. $S_{in}$ represents the seed for the encryption of the input atom. $S_{out}$ represents the seed out to derive seeds for encryption of successive atoms.

An XOR function is performed on input data block $P_0$ and $S_{in}$ for the atom encrypter to obtain the first encrypted block $C_0$. $S_{in}$ is encrypted repeatedly in encryption modules $E_k$. An XOR function is performed on each subsequent block of data $P_1 \ldots P_n$ of the input atom and a corresponding encrypted version of $S_{in}$ to obtain each subsequent encrypted block $C_1 \ldots C_n$. In the OFB mode, $S_{out}$ is the output of the last encryption block $E_k$. The encrypted atom is represented by $(C_0C_1 \ldots C_{n-1}C_n)$ where $C_0C_1 \ldots C_{n-1}$ are full encrypted blocks (64 bits or 128 bits), and $C_n$ is a final short encrypted block. Thus, the encrypted atom is of the same length as the original atom input into the atom encrypter. A decrypter may thus decrypt the encrypted atom without prior knowledge of C' for the reasons described above with reference to FIG. 5C.

Figure 5E:
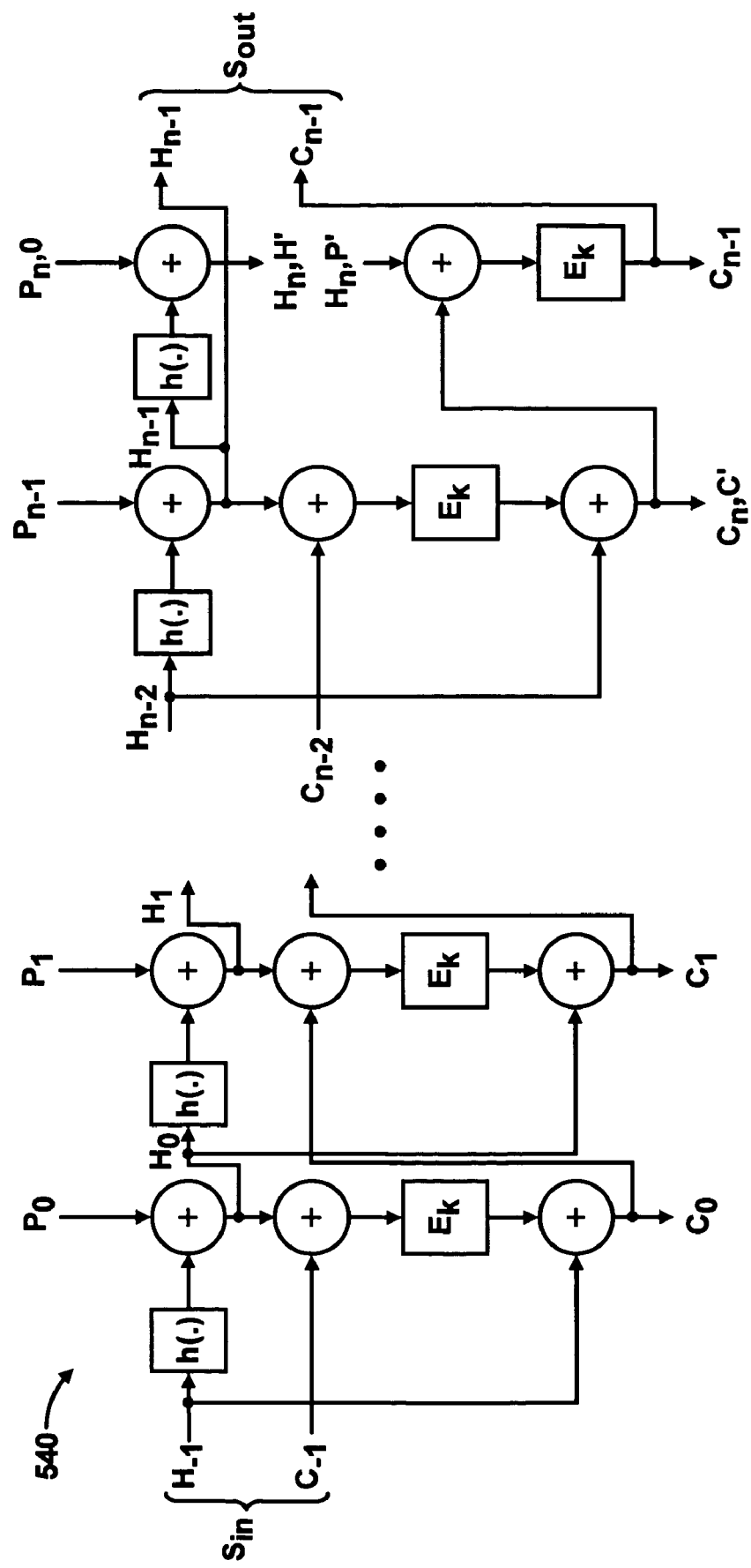
FIG. 5E illustrates a block cipher operating in an output feedback mode, according to an embodiment of the invention.

FIG. 5E illustrates a block cipher 540 operating in an accumulated block chaining (ABC) mode using ciphertext stealing to ensure that the length of the cipher is exactly the same as the length of the input atom. The ABC mode 540 is an error propagating mode, in which, in addition to the encryption operation being progressive, any change in a ciphertext block would make it impossible to decrypt current and all future plaintext blocks correctly. The ABC mode 540 may thus effectively prevent birthday attacks and diffuse patterns in the plaintext. Further, error propagating modes are relatively better matched to the progressive decoding dependencies that most often already exist in a generalized scalable bit-stream.

In order to ensure that the ciphertext has the same length in bits as the plaintext, ciphertext stealing may be adopted at the end of the logical unit. As shown in FIG. 5E, the initial state of the block cipher in the ABC mode 540 is given by $S_{in}=\{H_{-1}, C_{-1}\}$ of twice the length as the block cipher, with $H_{-1}$ and $C_{-1}$ representing two of its components each having the same length as the block cipher. The plaintext may be denoted as $(P_0, P_1,...,P_{n-1}, P_n)$, where $P_0$ through $P_{n-1}$ are full blocks (64 bits or 128 bits depending on the size of the block cipher $E_k$), and $P_n$ is a final short block. The corresponding ciphertext is $(C_0, C_1,...,C_{n-1}, C_n)$, where $C_n$ is short. The encryption steps include:

$$H_i = h(H_{i-1}) \text{ XOR } P_i, \; C_i = E_k(C_{i-1} \text{ XOR } H_i) \text{ XOR } H_{i-1},$$
$$i=0,1,\ldots,n-2.$$

$$H_{n-1} = h(H_{n-2}) \text{ XOR } P_{n-1}, \; C_n, C' = E_k(C_{n-2} \text{ XOR } H_{n-1}) \text{ XOR } H_{n-2}.$$

$$H_n, H' = h(H_{n-1}) \text{ XOR } P_n, 0, \; C_{n-1} = E_k(C_n, C' \text{ XOR } H_n, P') \text{ XOR } H_{n-2}.$$

Where h(.) is a simple function, such as, h(X)=X or h(X)=X>>1 (where >>denotes circular shift).

For the trivial case h(X)=0, the ABC mode 540 boils down to the Infinite Garble Extension (IGE) mode described, for instance, in "Design and Specification of Cryptographic Capabilities," by C. Campbell, in National Bureau of Standards Special Publication, US Dept. of Commerce, pp. 54-66, February 1978, the disclosure of which is hereby incorporated by reference in its entirety. The last two lines of the encryption equations above implement ciphertext stealing. P' is a padding pattern known to both the encrypter and decrypter from knowledge of the length of $P_n$. C' and H' are not transmitted.

In the ABC mode 540, $S_{out}=\{H_{n-1}, C_{n-1}\}$, where $C_{n-1}$ represents the output of the last encryption block and $H_{n-1}$ represents the output of an XOR function performed on $P_{n-1}$ and the output of h ($H_{n-2}$). The steps to decrypt a block encrypted using the ABC mode 540 include:

$$H_i = D_k(H_{i-1} \text{ XOR } C_i) \text{ XOR } C_{i-1}, \; P_i = h(H_{i-1}) \text{ XOR } H_i,$$
$$i=0,1,\ldots,n-2.$$

$$H_n, C' = D_k(C_{n-1}) \text{ XOR } C_n, P', \; H_{n-1} = D_k(H_{n-2} \text{ XOR } C_n, C') \text{ XOR } C_{n-2}.$$

$$P_{n-1} = h(H_{n-2}) \text{ XOR } H_{n-1}, \; P_n, H' = h(H_{n-1}) \text{ XOR } H_n, 0.$$

Any of the block cipher modes described, or variations thereof, may be used to encrypt atoms, with appropriate improvisations as needed to handle initial states and yield end states. In all of the block cipher modes 500, 510, 520, 530, 540, the seed out $S_{out}$ could, in general, be any function of the input block $(P_0, P_1,..., P_n)$ and the input seed $S_{in}$. In the CBC 500, PCBC 510 and CFB 520 modes shown in respective FIGS. 5A-5C, $S_{out}$ is chosen such that it may be relatively easily obtained from the ciphertext, by at most one block decryption, because of complexity considerations. However, in general, $S_{out}$ could be any arbitrary function of $(S_{in}, P_0, P_1,..., P_n)$. For example, one possibility is to use a cryptographic hash of $(S_{in}, P_0, P_1,..., P_n)$ as the $S_{out}$. The decrypter would then need to decrypt all of the causal atoms to determine the message block before the decrypter may determine the $S_{in}$ for a given atom.

Figure 6:
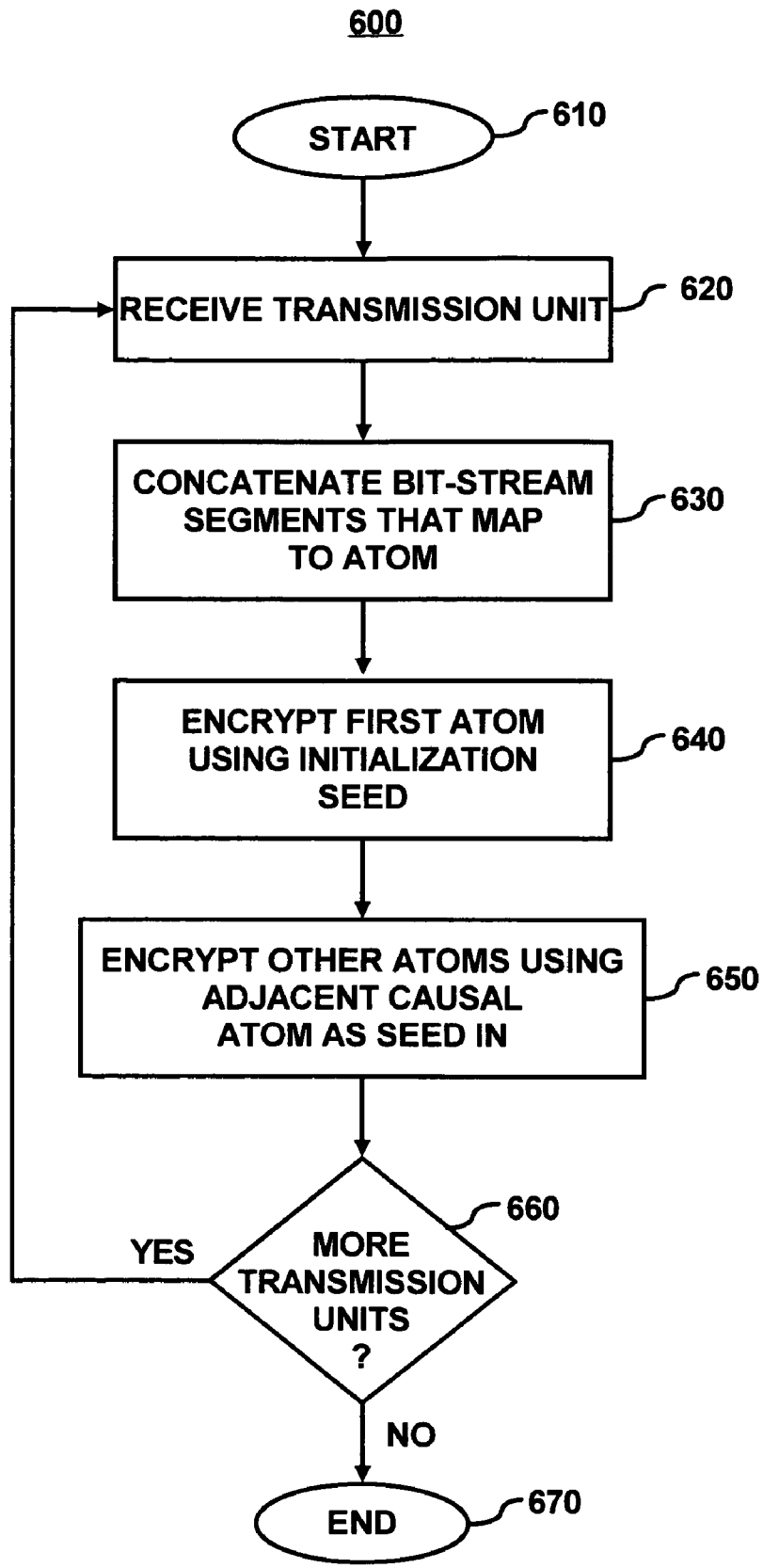
FIG. 6 is a flow diagram illustrating an example of a method of securely transmitting a generalized scalable bit-stream.

FIG. 6 is a flow diagram illustrating an operational mode 600 of a method of securely transmitting a generalized scalable bit-stream. It is to be understood that the following description of the operational mode 600 is but one manner of a variety of different manners in which a method of securely transmitting a generalized scalable bit-stream may be practiced. It should also be apparent to those of ordinary skill in the art that the operational mode 600 represents a generalized illustration and that other steps may be added or existing steps may be removed, modified or rearranged without departing from the scope of operational mode 600.

The description of the operational mode 600 is made with reference to FIGS. 1-5D, and thus makes reference to the elements cited therein. It should, however, be understood that the operational mode 600 is not limited to the elements set forth in FIGS. 1-5D. Instead, it should be understood that the operational mode 600 may be practiced by a transmission encryption unit, scalable bit-streams and/or a network having different configurations than those set forth in FIGS. 1-5D.

The operational mode 600 may be initiated or started as indicated at step 610. At step 620, a transmission unit is received for encryption. At step 630, for each atom, bit-stream segments that map to the atom are concatenated.

At step 640, the logically first atom in the transmission unit is encrypted using an initialization seed input. The initialization seed input may include a random initialization vector. In one example, the initialization seed input may be transmitted to a client 104, 106 for decrypting the transmission unit. In other examples, the initialization seed input may be the seed out of an encryption engine of a logically first atom of a preceding transmission unit. In this case, more than one transmission unit may be transmitted in a group, and one initialization seed input may be transmitted to the client 104, 106 to decrypt the group.

Thus, if the group consists of G transmission units, the initialization vector for the ith transmission unit (i=0, 1 ...G−1) may be denoted as $S_{in}[i](0,0...0)$. The initialization vector for the logically first atom of the first transmission unit may therefore be chosen to be:

$$S_{in}[0](0, 0...0) = \text{random}.$$

Then, for subsequent transmission units, under the assumption that the atom (0,0...0) will always be transmitted, and never deleted by any mid-stream adaptation process, the initialization vectors may be chosen using the rule:

$$S_{in}[i](0, 0...0) = S_{out}[i-1] (0, 0...0).$$

Thus, only the first initialization vector, $S_{in}[0](0, 0 \ldots 0)$, would need to be transmitted for the whole group. The rest of the initialization vectors would change automatically based on the encryption of the previous transmission unit while still allowing arbitrary adaptation of each transmission unit.

At step 650, successive atoms using a starting state for the encryption engine derived from the ending states of the encryption engine of all of its causal adjacent atoms differing in exactly one co-ordinate are encrypted, as described above with reference to FIGS. 2-4. At step 660, it is determined whether there are more transmission units to be sent. If there are more transmission units to be sent, steps 620-660 may be repeated.

If there are no more transmission units, the operational mode 600 may end as indicated at step 670. Ending the operational mode 600 may include transmitting the encrypted transmission unit(s) to a receiving client 104, 106. As described hereinabove, the encrypted transmission unit(s) may be sent through an adaptation engine 108.

Transmission of the encrypted transmission unit(s) may also include transmitting accompanying bit-stream description metadata that describes the high-level structure of the bit-stream. The metadata may provide information on the dimensions of the hypercube model 310 of the transmission unit, and the mapping of each atom to the actual bit-stream segments belonging to the atom. The metadata may be part of an unencrypted header of the bit-stream for each transmission unit. Since the encryption length is preserved, the metadata is valid for both unencrypted and encrypted content, assuming the initialization vectors $S_{in}$ (0, 0 . . .0) are transmitted separately.

Figure 7:
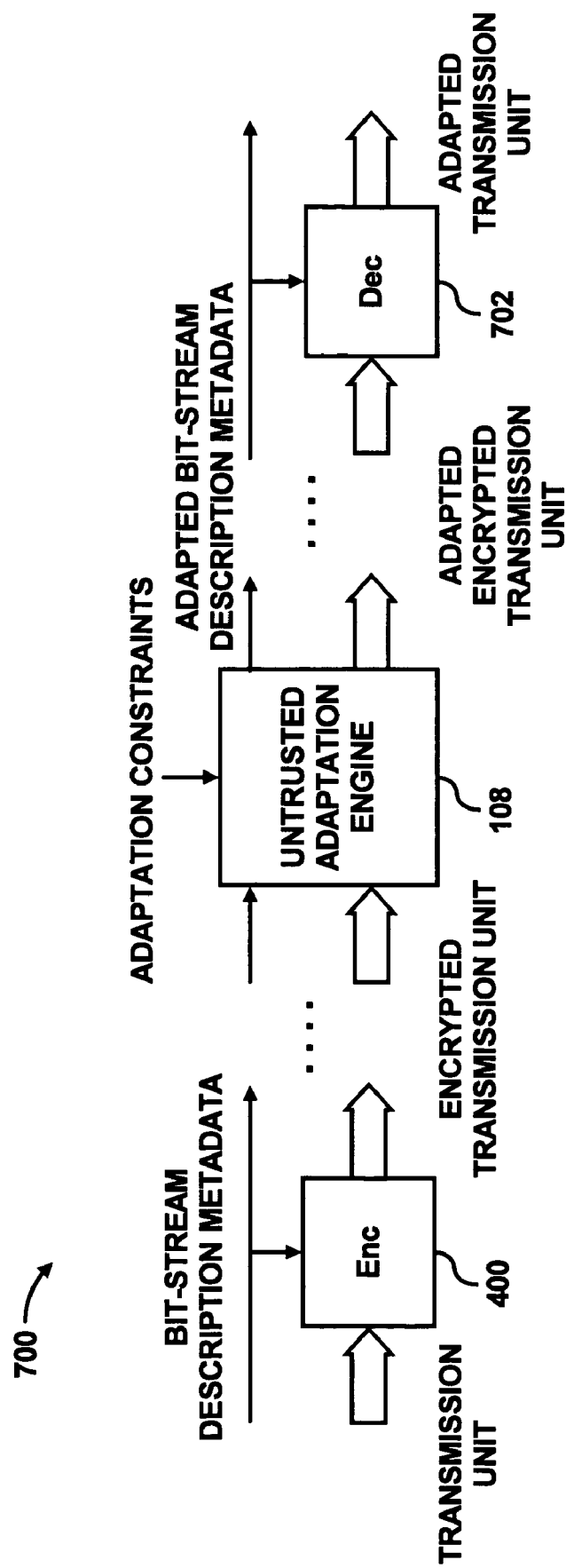
FIG. 7 is a block diagram illustrating the operation of securely transmitting a generalized scalable bit-stream.

FIG. 7 is a block diagram 700 illustrating the operation of securely transmitting a generalized scalable bit-stream. A transmission unit is input into a transmission unit encrypter 400 along with bit-stream description metadata describing the high-level structure of the transmission unit. An encrypted transmission unit is sent with bit-stream description metadata to an adaptation engine 108, which may include an untrusted adaptation engine. The adaptation engine 108 adapts the encrypted transmission unit and transmits the adapted encrypted transmission unit along with the bit-stream description metadata to a client 104, 106 including a decrypter 702. The decrypter 702 decrypts the adapted encrypted transmission unit to obtain the adapted transmission unit.

As discussed above, the transmitted bit-stream is associated with metadata that provides the logical model information as well as the high-level syntax description of the corresponding bit-stream. Together the logical model information and the high-level syntax description convey the mapping between the logical model and the actual bit-stream layout. This information enables a format-independent adaptation engine, such as adaptation engine 108, to know where the segments corresponding to deleted atoms lie in the bit-stream. In addition, other information that enables a format-independent adaptation engine to appropriately update updateable fields may be provided in the metadata. Segments corresponding to updateable fields, as derived from the metadata, are left unencrypted by the encryption engines, since the adaptation engine may need to update these values in conjunction with deletion of segments corresponding to deleted atoms. Typically, such fields are a small portion of the bit-stream, and leakage of such information does not provide any information about the actual content.

The only content a network adaptation engine 108 needs to adapt is the bit-stream description metadata, which conveys which parts of the encrypted bit-stream to drop for each possible adaptation. The adaptation engine 108 may also use the bit-stream description metadata to conduct other minor update operations on unencrypted fields of the bit-stream. However, because the bulk of the data is encrypted, the adaptation engine 108 can not use the information in the metadata to decrypt or decode the transmitted content. The bit-stream description metadata may not be used for much more than adaptation of encrypted and unencrypted scalable content.

The same bit-stream description metadata may be all that an encrypter or decrypter needs to encrypt/decrypt the content. Thus, an efficient encrypter or decrypter may be created that uses the bit-stream description information to directly encrypt/decrypt, rather than decode the bit-stream to know where the atoms lie. Furthermore, by adding appropriate information in the metadata, the steps of encryption, decryption and adaptation may all be conducted in a fully format-independent manner.

Since the encryption is length preserving, the high-level syntax description, which may make up a major part of the metadata, remains the same for both encrypted and unencrypted data. Thus, the same metadata that enables format-independent adaptation can be used to drive the encryption and decryption engines in a format-independent manner as well, thus enabling a fully format independent secure delivery mechanism for generalized scalable bit-streams.

The encrypter 400 may be fully format independent since it may depend only on the metadata to perform the encryption, and does not need to be designed specifically for a known format. The decrypter 702 may also be fully format independent since it also may depend only on the metadata to decrypt, and does not need to be designed specifically for a known format. The adaptation engine 108 may also include a format-independent adaptation engine, such as the adaptation engine described in U.S. patent application Ser. No. 10/196,506, entitled "System, Method and Format Thereof For Scalable Encoded Media Delivery," filed on Jul. 15, 2002 by Debargha Mukherjee, U.S. patent application Ser. No. 10/724,284, entitled "Method And Apparatus For Applying Receiving Attributes Using Constraints," filed on Nov. 26, 2003 by Debargha Mukheree and Geraldine Kuo, U.S. patent application Ser. No. 10/724,285, "Method And Apparatus For Updating Offset Fields" filed on Nov. 26, 2003 and U.S. patent application Ser. No. 10/724,556, "Method And Apparatus For Updating Sequences In A Bitstream," filed on Nov. 26, 2003, all of which are commonly assigned and hereby incorporated by reference in their entireties. Thus, the encrypter 400, the decrypter 702 and the adaptation engine 108, which are part of the delivery infrastructure, can be fully format-independent and can be supported by generic servers without needing knowledge of the bit-stream format. Thus, even proprietary formats may be sent securely over a network.

Figure 8:
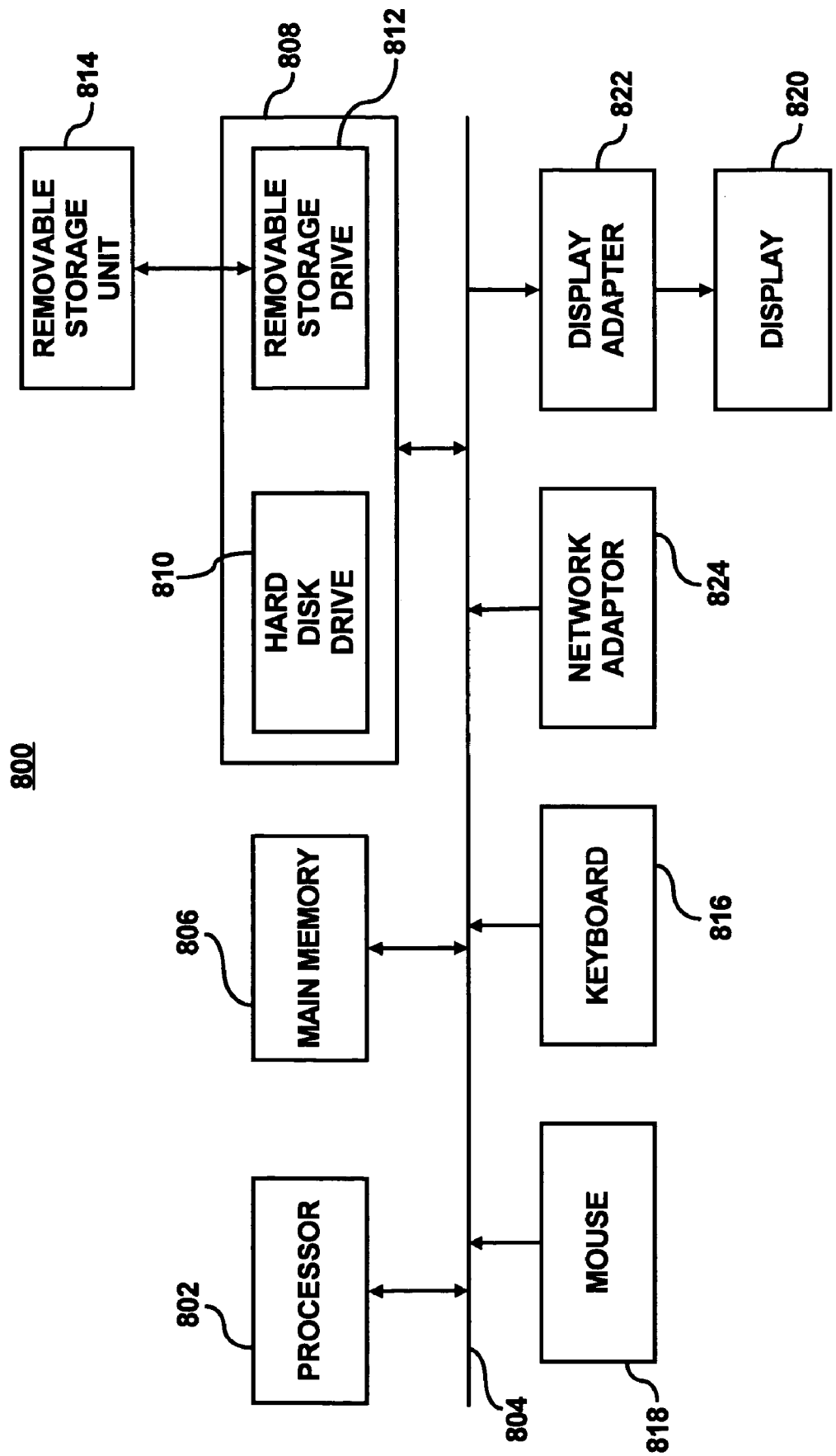
FIG. 8 is a block diagram illustrating a computer system operable to perform the operational mode depicted in FIG. 6.

FIG. 8 illustrates a computer system 800 operable to control the process of transmitting generalized scalable bit-streams described with respect to the operational mode 600. In this respect, the computer system 800 may be used as a platform for executing one or more of the functions described hereinabove with respect to the various steps outlined in the operational mode 600.

The computer system 800 includes one or more controllers, such as a processor 802. The processor 802 may be used to execute some or all of the steps described in the operational mode 200. Commands and data from the processor 802 are communicated over a communication bus 804. The computer system 800 also includes a main memory 806, such as a random access memory (RAM), where a program code may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the operational mode 600 may be stored.

The removable storage drive 812 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor 802 may communicate over a network, for instance, the Internet, LAN, etc., through a network adaptor 824.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of encrypting a transmission unit of a generalized scalable bit-stream, the transmission unit being modeled in a multi-dimensional scalable representation including a plurality of atoms, the method comprising:

for each atom of the transmission unit, concatenating bit-stream segments that map to the atom to obtain data for each atom;

encrypting the data for a logically first atom of the plurality of atoms of the multi-dimensional scalable representation using an initialization input to produce an encryption output seed of the logically first atom and an encrypted logically first atom; and encrypting the data of other atoms of the plurality of atoms of the multi-dimensional scalable representation to produce encrypted other atoms and an encryption output seed of each encrypted other atom, wherein encrypting a particular atom of the other atoms comprises using encryption output seeds of adjacent causal atoms of the particular atom as an encryption input seed for encrypting the particular atom.

2. The method of claim 1, wherein the encrypting steps comprise encrypting the data using cipher block chaining encryption.

3. The method of claim 1, wherein the encrypting steps comprise encrypting the data using propagating cipher block chaining encryption.

4. The method of claim 1, wherein the encrypting steps comprise encrypting the data using cipher feedback mode encryption.

5. The method of claim 1, wherein the encrypting steps comprise encrypting the data using output feedback mode encryption.

6. The method of claim 1, wherein the encrypting steps comprise encrypting the data using an error propagating encryption mode.

7. The method of claim 6, wherein the encrypting steps further comprise encrypting the data using accumulated block chaining mode encryption.

8. The method of claim 1, wherein the encrypting steps comprise performing cipher text stealing such that a length of data of an atom input for encryption in an atom encrypter is of an equal length to a length of a resulting encrypted data of the atom output from the atom encrypter.

9. The method of claim 1, further comprising:

producing the encryption output seed for at least one of the logically first atom and the other atoms by performing a function of cipher block inputs and cipher block outputs of an atom encrypter.

10. The method of claim 9, wherein the step of performing a function of the cipher block inputs and the cipher block outputs includes performing at least one of outputting an output of a last cipher block of the atom encrypter as the encryption output seed, outputting an input of the last cipher block as the encryption output seed, and performing an exclusive OR function of all of the cipher block inputs of the atom encrypter to obtain the encryption output seed.

11. The method of claim 1, further comprising:

producing the encryption output seed for at least one of the logically first atom and the other atoms by performing a function of cipher block inputs of an atom encrypter.

12. The method of claim 1, wherein the step of encrypting the data for the logically first atom using an initialization input seed comprises encrypting the data for the logically first atom using a random initialization input seed.

13. The method of claim 1, wherein the step of encrypting the data for the logically first atom using an initialization input seed comprises encrypting the data for the logically first atom using an initialization input seed based on an encryption output seed of a logically first atom of an immediately preceding transmission unit.

14. The method of claim 1, wherein the step of encrypting the particular atom comprises receiving an encryption output seed of each adjacent causal atom of the particular atom and performing an exclusive OR function on the received encryption output seeds to produce the encryption input seed for the particular atom.

15. The method of claim 1, wherein the encryption out put seeds to produce the encryption input seed for the particular atom.

16. The method of claim 1, wherein the transmission unit comprises at least one transmission unit to a receiving device, the method further comprising:

transmitting the at least one transmission unit to the receiving device with an accompanying bit-stream description metadata.

17. The method of claim 16, wherein the step of encrypting the data for a logically first atom comprises encrypting the data for a logically first atom of the plurality of atoms using a random initialization input to produce an encryption output seed of the logically first atom and an encrypted logically first atom, the method further comprising:

transmitting the random initialization input to the receiving device to decrypt the transmission unit.

18. The method of claim 16, wherein the step of transmitting the transmission unit comprises transmitting the transmission unit independently of other transmission units in the generalized scalable bit-stream.

19. The method of claim 16, wherein the step of encrypting the data for the logically first atom using an initialization input comprises encrypting the data for the logically first atom using a random initialization input.

20. The method of claim 16, wherein the step of encrypting the data for the logically first atom using an initialization input comprises encrypting the data for the logically first atom using an initialization input based on an encryption output seed of a logically first atom of an immediately preceding transmission unit.

21. The method of claim 16, wherein the step of transmitting the transmission unit comprises grouping at least two transmission units together and transmitting the at least two transmission units, and transmitting a single initialization input to the receiving device for the at least two transmission units.

22. The method of claim 16, wherein the accompanying bit-stream description metadata comprises a high-level structure of the bit-stream.

23. A method of transmitting generalized scalable bit-streams including at least one transmission unit to a client device, the method comprising:
   receiving a request for media content from the client device;
   obtaining a transmission unit of the media content, each transmission unit being modeled in a multi-dimensional scalable representation including a plurality of atoms;
   for each atom of the transmission unit, concatenating bit-stream segments that map to the atom to obtain data for each atom;
   encrypting the data for a logically first atom of the plurality of atoms of the multi-dimensional scalable representation using a random initialization input to produce an encryption output seed of the logically first atom and an encrypted logically first atom;
   encrypting the data of other atoms of the plurality of atoms of the multi-dimensional scalable representation to produce encrypted other atoms and an encryption output seed of each encrypted other atom, wherein the step of encrypting a particular atom of the other atoms comprises using encryption output seeds of adjacent causal atoms of the particular atom as an encryption input seed for encrypting the particular atom; and
   transmitting an encrypted transmission unit including the encrypted atoms with an accompanying bit-stream description metadata to the client device.

24. The method of claim 23, further comprising:
   receiving the encrypted transmission unit and at least one of a bit-stream description metadata for the transmission unit and the initialization input for the encrypted transmission unit.

25. The method of claim 24, further comprising:
   decrypting the encrypted transmission unit.

26. The method of claim 24, further comprising:
   adapting the encrypted transmission unit for transmitting to the client device.

27. The method of claim 26, wherein the step of adapting the transmission unit comprises scaling the transmission unit.

28. The method of claim 24, further comprising decrypting the encrypted transmission unit based on the at least one of a bit-stream description metadata for the transmission unit and the initialization input for the encrypted transmission unit.

29. The method of claim 23, wherein the encryption output seed of the logically first atom is produced in response to at least an encrypted block of the encrypted logically first atom.

30. The method of claim 23, wherein the accompanying metadata includes information used to encrypt the transmission unit.

31. A system for transmitting a transmission unit of a generalized scalable bit-stream, the transmission unit being modeled in a multi-dimensional scalable representation including a plurality of atoms, the system comprising:
   an encrypter configured to, for each atom of the transmission unit, concatenate bit-stream segments that map to the atom to obtain data for each atom, encrypt the data for a logically first atom of the plurality of atoms of the multi-dimensional scalable representation using an initialization input to produce an encryption output seed of the logically first atom and an encrypted logically first atom, encrypt the data of other atoms of the plurality of atoms of the multi-dimensional scalable representation to produce encrypted other atoms and an encryption output seed of each encrypted other atom, wherein a particular atom of the other atoms is encrypted using encryption output seeds of adjacent causal atoms of the particular atom as an encryption input seed for encrypting the particular atom, and transmit an encrypted transmission unit including the encrypted atoms with an accompanying bit-stream description metadata to a client device.

32. The system of claim 31, wherein the encryption output seed of the logicallly first atom is produced in response to at least an encrypted block of the encrypted logically first atom. The system of claim 32, wherein the encryption output seed of the logicallly first atom is produced in response to at least an encrypted block of the encrypted logically first atom.

33. The system of claim 31, wherein die adaptation engine is configured to scale the transmission unit.

34. The system of claim 31, wherein the deerypter is configured to decrypt the encrypted transmission unit based on the at least one of a bit-stream description metadata for the transmission unit and the initialization input for the encrypted transmission unit.

35. A system for transmitting a transmission unit of a generalized scalable bit-strewn, the transmission unit being modeled in a multi-diniensional scalable representation including a plurality of atoms, the system comprising:
   an encrypter configured to, for each atom of the transmission unit, concatenate bit-stream segments that map to the atom to obtain data for each atom, encrypt the data for each atom to produce an encrypted output seed of the respective atom and an encrypted respective atom, and transmit an encrypted transmission unit including the encrypted atoms with an accompanying bit-stream description meradata to a client device, wherein the encrypter is configured to encrypt the data in a format-independent manner by using the bit-stream description metadata, wherein the encryption output seed of each atom is produced in response to at least an encrypted block of the encrypted respective atom;
   an adaptation engine configured to adapt the encrypted transmission unit in a format-independent manner based on the bit-stream description metadata for transmitting to the client device; and
   a decryption module configured to decrypt the encrypted transmission unit in a format-independent manner based on the bit-stream description metadata.

36. A system for encrypting a transmission unit of a generalized scalable bit-strewn, the transmission unit modeled in a multi-dimensional scalable representation including a plurality of atoms, the system comprising:
   for each atom of the transmission unit, means for concatenating bit-stream segments that map to the atom to obtain data for each atom;
   means for encrypting the data far a logically first atom of the plurality of atoms of the multi-dimensional scalable representation using an initialization input to produce an encryption output seed of the logically tint atom and an encrypted logically fim atom; and
   means for encrypting the data of other atoms of the plurality of atoms of the multi-dimensional scalable representation to produce encrypted other atoms and an encryption output seed of each encrypted other atom, wherein the means for encrypting the data of other atoms includes means for encrypting a particular atom of the other atoms, said means for encrypting a particular atom being configured to use encryption output seeds of adjacent causal atoms of the particular atom as an encryption input seed for encrypting the particular atom.

37. The system of claim 25, wherein the encryption output seed of the logically first atom produced in response to at least an encrypted block of the encrypted logically first atom.

38. A computer readable storage medium on which is embedded one or more computer programs, said one or more computer programs implementing a method of encrypting a transmission unit of a generalized scalable bit-stream, the transmission unit modeled in a multi-dimensional scalable representation including a plurality of atoms, said one or more computer programs comprising a set of instructions for:

for each atom of the transmission unit, concatenating bit-stream segments that map to the atom to obtain data for each atom;

encrypting the data for a logically first atom of plurality of atoms of the multi-dimensional scalable representation using an initialization input to produce an encryption output seed of the logically first atom and an encrypted logically first atom; and encrypting the data of other atoms of the plurality of atoms of the multi-dimensional scalable representation to produce encrypted other atoms and an enayption output seed of each encrypted other atom, wherein the step of encrypting a particular atom of the other atoms comprises using encryption output seeds of adjacent causal atoms of the particular atom as an encryption input seed for encrypting the particular atom.

39. The computer readable medium of claim 38, wherein the eneryption output seed of the logically first atom is produced in response to at least an encrypted block of the encrypted logically first atom.

40. The computer readable medium of claim 38, said one or more computer programs further comprising a set of instructions for:

transmitting an encrypted transmission unit including the encrypted atoms with an accompanying bit-stream description metadata to a client device.

* * * * *

UNITED STATES PATENT AND TRADEMARK OFFICE
CERTIFICATE OF CORRECTION

PATENT NO. : 7,483,535 B2  Page 1 of 2
APPLICATION NO. : 10/940961
DATED : January 27, 2009
INVENTOR(S) : Debargha Mukherjee et al.

It is certified that error appears in the above-identified patent and that said Letters Patent is hereby corrected as shown below:

In column 6, line 55, delete "XOR $S_{in}(i_1, i_2...i_n)$" and insert -- XOR $S_{in}(i_1, i_{2-1}...i_n)$ --, therefor.

In column 12, line 32, delete "Mukheree" and insert -- Mukherjee --, therefor.

In column 14, lines 37-39, in Claim 15, delete "The method of claim 1, wherein the encryption out put seeds to produce the encryption input seed for the particular atom." and insert -- The method of claim 1, wherein the encryption output seed of the logically first atom is produced in response to at least an encrypted block of the encrypted logically first atom. --, therefor.

In column 16, lines 16-19, in Claim 32, after "atom." delete "The system of claim 32, wherein the encryption output seed of the logicallly first atom is produced in response to at least an encrypted block of the encrypted logically first atom.".

In column 16, line 20, in Claim 33, delete "die" and insert -- the --, therefor.

In column 16, line 22, in Claim 34, delete "deerypter" and insert -- decrypter --, therefor.

In column 16, line 28, in Claim 35, delete "bit-strewn," and insert -- bit-stream, --, therefor.

In column 16, line 29, in Claim 35, delete "multi-diniensional" and insert -- multi-dimensional --, therefor.

In column 16, line 34, in Claim 35, delete "encrypted" and insert -- encryption --, therefor.

In column 16, line 38, in Claim 35, delete "meradata" and insert -- metadata --, therefor.

In column 16, line 52, in Claim 36, delete "bit-strewn," and insert -- bit-stream, --, therefor.

In column 16, line 58, in Claim 36, delete "far" and insert -- for --, therefor.

In column 16, line 61, in Claim 36, delete "tint" and insert -- first --, therefor.

UNITED STATES PATENT AND TRADEMARK OFFICE
CERTIFICATE OF CORRECTION

PATENT NO. : 7,483,535 B2
APPLICATION NO. : 10/940961
DATED : January 27, 2009
INVENTOR(S) : Debargha Mukherjee et al.

It is certified that error appears in the above-identified patent and that said Letters Patent is hereby corrected as shown below:

In column 16, line 62, in Claim 36, delete "fim" and insert -- first --, therefor.

In column 17, line 6, in Claim 37, delete "claim 25," and insert -- claim 36, --, therefor.

In column 17, line 7, in Claim 37, after "atom" insert -- is --.

In column 17, line 21, in Claim 38, after "atom of" insert -- the --.

In column 18, line 6, in Claim 38, delete "enayption" and insert -- encryption --, therefor.

In column 18, line 13, in Claim 39, delete "eneryption" and insert -- encryption --, therefor.

Signed and Sealed this

Twelfth Day of May, 2009

JOHN DOLL
*Acting Director of the United States Patent and Trademark Office*